(12) United States Patent
Wiklof (10) Patent No.: US 12,072,098 B1
(45) Date of Patent: Aug. 27, 2024

(54) ULTRA WIDEBAND COMBUSTION SENSOR AND SYSTEMS

(71) Applicant: Christopher A. Wiklof, Everett, WA (US)

(72) Inventor: Christopher A. Wiklof, Everett, WA (US)

( * ) Notice: Subject to any disclaimer, the term of this patent is extended or adjusted under 35 U.S.C. 154(b) by 0 days.

(21) Appl. No.: 18/486,411

(22) Filed: Oct. 13, 2023

Related U.S. Application Data (63) Continuation of application No. 17/358,807, filed on Jun. 25, 2021, now Pat. No. 11,821,628.

(60) Provisional application No. 63/044,079, filed on Jun. 25, 2020.

(51) Int. Cl.
*F23N 1/00* (2006.01)
*G01M 15/10* (2006.01)
*G05D 7/06* (2006.01)

(52) U.S. Cl.
CPC ............. *F23N 1/002* (2013.01); *G01M 15/10* (2013.01); *G05D 7/0623* (2013.01); *F23D 2208/10* (2013.01); *F23N 2229/00* (2020.01)

(58) Field of Classification Search
CPC ........ F23N 1/00; F23N 1/002; F23N 2229/00; G01M 15/10; G05D 7/0623
USPC .......................................................... 431/75
See application file for complete search history.

(56) References Cited

U.S. PATENT DOCUMENTS

| | | | |
|---|---|---|---|
| 5,472,336 A | 12/1995 | Adams et al. | |
| 7,927,095 B1* | 4/2011 | Chorpening | F23N 1/022 700/274 |
| 8,838,367 B1 | 9/2014 | McAlister | |
| 2007/0188971 A1 | 8/2007 | Chian et al. | |
| 2020/0309046 A1 | 10/2020 | Deivasigamani et al. | |
| 2021/0254826 A1 | 8/2021 | Kendrick et al. | |
| 2021/0302370 A1 | 9/2021 | Calvo et al. | |
| 2023/0042379 A1 | 2/2023 | Zhang et al. | |
| 2023/0211149 A1 | 7/2023 | Gurfein et al. | |
| 2023/0235880 A1 | 7/2023 | Ishii et al. | |

* cited by examiner

*Primary Examiner* — Vivek K Shirsat
(74) *Attorney, Agent, or Firm* — Launchpad IP, Inc.; Christopher A. Wiklof (57) ABSTRACT

An ultra wideband (UWB) combustion sensor detects presence or absence of combustion corresponding to an effect on a transmitted, time-gated pulse and detection by a presence or absence of charged particles associated with combustion. A combustion system includes a UWB combustion sensor. A method for operating a combustion system includes operation of a UWB combustion sensor.

25 Claims, 6 Drawing Sheets

FIG. 3B
VIEW A-A

FIG. 3C
VIEW B-B

FIG. 4

ULTRA WIDEBAND COMBUSTION SENSOR AND SYSTEMS

CROSS REFERENCE TO RELATED APPLICATIONS

The present application is a continuation of U.S. application Ser. No. 17/358,807, entitled "ULTRA WIDEBAND COMBUSTION SENSOR AND SYSTEMS", filed Jun. 25, 2021, and claims priority benefit from U.S. Provisional Application No. 63/044,079, entitled "ULTRA WIDEBAND COMBUSTION SENSOR AND SYSTEMS", filed Jun. 25, 2020, which, to the extent not inconsistent with the disclosure herein, is incorporated by reference.

SUMMARY

According to an embodiment, an ultra wideband (UWB) combustion sensor includes a pulse generator configured to output a voltage pulse, a transmission electrode operatively coupled to the pulse generator and configured to output the voltage pulse into a combustion volume as a transmitted pulse, and a receiving electrode configured to receive the transmitted pulse as a received pulse from the combustion volume. The UWB combustion sensor may also include a receiver circuit operatively coupled to the pulse generator and to the receiving electrode and configured to sample and hold the received pulse, an analog-to-digital converter operatively coupled to the receiver circuit and configured to output a digital sensed value proportional to a received charge sampled and held by the receiver circuit, and a signal processor operatively coupled to the analog-to-digital converter and configured to receive a series of sensed values from the analog-to-digital converter and output a combustion state variable indicative at least of a presence or absence of a combustion reaction in the combustion volume.

According to an embodiment, a combustion system includes one or more main fuel nozzles configured to output fuel into a combustion volume, a combustion air source configured to provide combustion air into the combustion volume, and a flame holder aligned to receive mixed fuel and air from the fuel nozzle and combustion air source, the flame holder being configured to hold a combustion reaction supported by the fuel and the combustion air. The combustion system also includes a UWB combustion sensor configured to transmit a transmitted electromagnetic pulse toward the combustion reaction from a first separation distance and to detect, at a second separation distance, a received electromagnetic pulse affected by the combustion reaction. The UWB combustion sensor may output a combustion state variable corresponding to the relative concentration of charged particles associated with combustion near the flame holder. A burner controller operatively coupled to the UWB combustion sensor may be configured to control the combustion reaction responsive to the received combustion state variable.

According to an embodiment, a method for operating a combustion system includes providing fuel and combustion air to a burner, outputting, with an output antenna, a time-gated voltage pulse at a first moment to a region intended to hold a combustion reaction supported by the fuel and combustion air, and receiving a time-gated response signal from the region intended to hold the combustion reaction at a second moment delayed relative to the first moment. Embodiments include comparing, with a digital processor, the response signal to either or both of a pattern corresponding to a presence of combustion or a pattern corresponding to an absence of the combustion reaction. The method includes determining, with the digital processor, whether a combustion state corresponds to presence or to absence of the combustion reaction, based upon the comparison(s) to the known state(s), and outputting a combustion state variable corresponding to the presence or absence of the combustion reaction. The method may include controlling or maintaining a fuel source (such as by maintaining or exerting control of a valve) for the fuel according to the combustion state variable and a desired state. The method may include calibrating the system by obtaining response signals from known states (e.g., during burner installation with visual confirmation of state) to create the patterns corresponding to presence and absence of combustion.

DETAILED DESCRIPTION

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

Figure 1A:
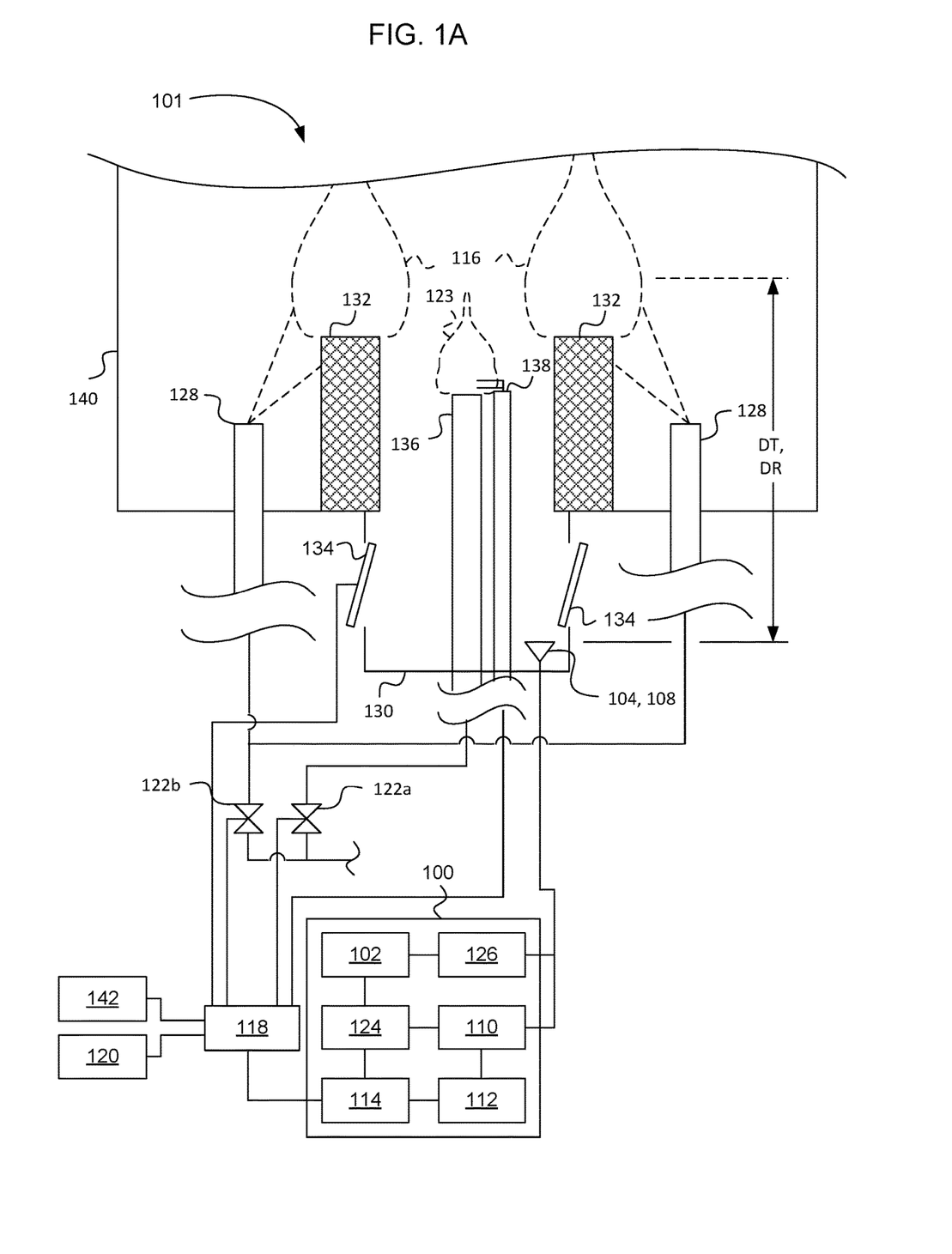
FIG. 1A is a simplified block diagram of a combustion system including an ultra wideband (UWB) combustion sensor, according to an embodiment.
Figure 1B:
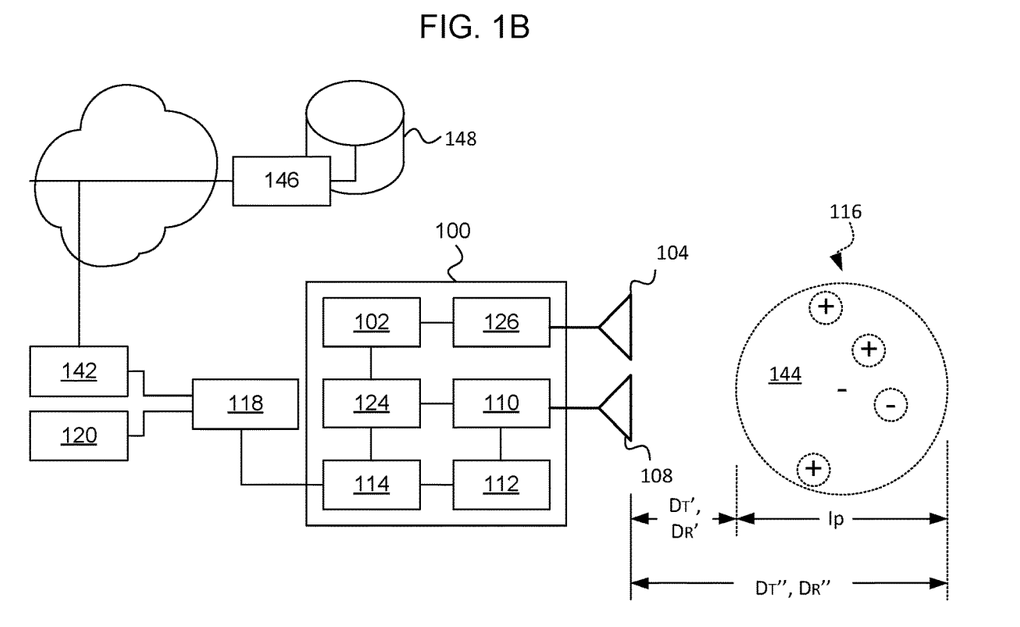
FIG. 1B is a simplified block diagram of a UWB combustion sensor showing interaction with charged particles associated with a combustion reaction, according to an embodiment.
Figure 1C:
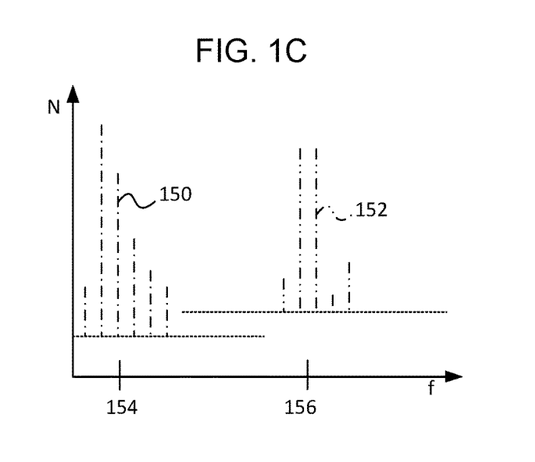
FIG. 1C is a diagram showing illustrative frequency domain responses from the UWB combustion sensor of FIGS. 1A and 1B, according to an embodiment.

FIG. 1A is a simplified block diagram of a combustion system 101 including an ultra wideband (UWB) combustion sensor 100, according to an embodiment. FIG. 1B is a simplified block diagram of a UWB combustion sensor in combination with a combustion system controller showing interaction of the UWB combustion sensor with charged particles associated with a combustion reaction, according to an embodiment. FIG. 1C is a diagram showing illustrative frequency domain responses from the UWB combustion sensor of FIGS. 1A and 1B, according to an embodiment.

According to embodiments, referring to FIGS. 1A, 1B, and 1C, a UWB combustion sensor 100 includes a pulse generator 102 configured to output a voltage pulse and a transmission electrode 104 operatively coupled to the pulse generator 102, the pulse generator and transmission electrode 104 being configured to output a transmitted pulse into a combustion volume 106. A receiving electrode 108 is operatively coupled to a receiver circuit 110, the receiving electrode 108 and receiver circuit being configured to receive a wideband received pulse corresponding to the transmitted pulse from the combustion volume 106. The receiver circuit 110 may be operatively coupled to the pulse generator 102 to provide timing input which is used by the receiver circuit to synchronize sampling and holding of one or more frequency components of the received pulse to a time-of-flight delay after transmission of the transmitted pulse. An analog-to-digital converter 112 is operatively coupled to the receiver circuit 110 and configured to output a digital sensed value proportional to a received charge sampled and held by the receiver circuit 108 at one or more of a plurality of frequency components of the received pulse. A digital signal processor 114 is operatively coupled to the analog-to-digital converter 112 and configured to receive a series of sensed values from the analog-to-digital converter 112 and output a combustion state variable indicative at least of a presence or absence of a combustion reaction 116 in the combustion volume 106.

In an embodiment, at least one of the transmission electrode 104 or the receiving electrode 108 is formed of a temperature-stable and oxidation-stable material configured to withstand exposure to at least radiation heat transfer from the combustion reaction 116. At least one of the transmission electrode 104 or the receiving electrode 108 may be formed from a high temperature steel, a superalloy, and/or silicon carbide. In another embodiment, the UWB combustion sensor 100 further includes an air duct (not shown) operable to provide cooling air in a vicinity of at least one of the transmission electrode 104 or the receiving electrode 108 (e.g., as natural draft overfire air).

According to an embodiment, the UWB combustion sensor 100 further includes an electronic controller 118 operatively coupled to the pulse generator 102 and the signal processor 114, the electronic controller 118 being configured to control operation of the pulse generator 102 and the signal processor 114, and to receive the combustion state variable from the signal processor 114. In one embodiment, the electronic controller 118 is operatively coupled to a user interface 120 and is operable to output an indication of the combustion state variable to a user via the user interface 120. The electronic controller 118 may be operatively coupled to a fuel flow control valve 122a, 122b, and the electronic controller 118 may be configured to control the fuel flow control valve 122a, 122b responsive to the combustion state variable For example, during unstable operation (described below), the controller may reduce fuel flow through a main fuel flow control valve 122b and increase fuel flow through a pilot burner fuel flow control valve 122a to ensure complete ignition. As may be appreciated from description herein and inspection of FIG. 3B, the UWB combustion sensor may be used to detect a pilot flame 123. During start-up, especially, detection or non-detection of a pilot flam 123 may be used to drive operation of an ignitor 138.

In an embodiment, the transmitted pulse is modified into the received pulse according to the presence or absence of the combustion reaction 116 during transmission of the pulse through the combustion volume 106. The combustion reaction 116 may be characterized by a presence of a volume of charged particles proximate to the combustion reaction 116, and the transmitted pulse may be modified by passing through the combustion volume 106 and the volume of charged particles when the combustion reaction 116 is present. In another embodiment, the combustion reaction 116 is characterized by a presence of a volume of charged particles proximate to the combustion reaction 116, and the transmitted pulse is modified by passing through the combustion volume 106 and by not passing through the volume of charged particles when the combustion reaction 116 is absent. Additionally and/or alternatively, the combustion reaction 116 is characterized by a presence of a volume of charged particles proximate to the combustion reaction 116. The presence of the volume of charged particles may affect a capacitance of the combustion volume 106, and the signal processor 114 may be configured to detect a first combustion volume 106 capacitance characterized by a combustion reaction 116 and to detect a second combustion volume 106 capacitance characterized by a lack of a combustion reaction 116.

In an embodiment (illustrated in FIG. 1A), the transmission electrode 104 and the receiving electrode 108 are the same electrode. In another embodiment (illustrated in FIGS. 1B and 2), the transmission electrode 104 and the receiving electrode 108 may be different electrodes. In another embodiment (illustrated in FIGS. 3A, 3B, and 3C) the transmission electrode 104 and receiving electrode 108a, 108b, 108c, 108d may be dynamically assigned such that a probed region may be selected along any axis joining any two electrodes.

When a transmission electrode 104 is also used as a receiving electrode 108, a filter may be used to prevent a conducted pulse from damaging a receiver circuit or otherwise confounding the measurement of a pulse.

The UWB combustion sensor 100 may include a filter 124 configured to prevent the transmission and receiving electrodes 104, 108 from sensing the transmitted pulse prior to modification of the transmitted pulse to the received pulse by passage of the pulse through the combustion volume 106. The filter 124 may include a range delay configured to cause the receiver circuit to trigger and capture a received pulse after a first propagation delay $D_T$ corresponding to passage of the transmitted pulse from the transmission electrode 104 to a detection location and after a second propagation delay $D_R$ to backscatter from the detection location to the receiving electrode 108. The detection location may, for example, correspond to a nominal combustion reaction 116 location separated from the transmission and receiving electrodes 104, 108 by distances respectively corresponding to $D_T$ and $D_R$.

Referring to FIG. 1B, the UWB combustion sensor 100 transmits a series of wideband pulses toward a nominal position of a combustion reaction 116. Combustion reactions 116 may be characterized by a presence of transient charged particles, indicated as being present within a region 144 corresponding to the combustion reaction. Experiments have shown that when combustion is not present, then charged particles associated with combustion are also not present. Conversely, when combustion is present, then the charged particles are also present. When a transmitted pulse is output from the transmission electrode 104, the pulse may multipath, reflect, and otherwise propagate through the combustion volume. In practice, the combustion volume 140 is characterized in the absence of a stable flame by transmitting a series of wideband pulses with the transmission electrode 104, and receiving a response to the series of wideband pulses with the receiving electrode 108. At least during characterization, the receiver circuit 110 may capture wideband pulses at each of a number of range delays. The burner system may then be fired and the procedure repeated to characterize received pulses under combustion conditions. Notwithstanding a predetermined time-of-flight, received pulses (in frequency domain) may be compared to identify probing parameters, which may include, for example, range delay(s), capture duration(s), and passband(s), under which combustion conditions are probabilistically distinguished.

FIG. 1C illustrates two theoretical frequency domain responses 150 and 152 that may respectively correspond to combustion presence (i.e., charged particle presence) and combustion absence. The combustion present vs. combustion absent responses 150, 152 may be characterized by different spreads, a different shapes, different frequency centers 154, 156, and/or different attenuation N.

Returning again to FIG. 1B, in an embodiment, one or more models for each given system are maintained by a server computer 146 with a model storage memory 148. Models may subsequently be updated by selectively modulating probing parameters to build a larger dataset. By making the UWB sensor 100 programmable, probing parameters may be adjusted to accommodate improvements in combustion condition distinguishing and/or to accommodate wear or other changes in the furnace environment. During operation, range delay (and/or other parameter(s)) may be selected to detect changes in position of combustion location. For example, during normal (combustion present) operation, the combustion reaction may occupy a location corresponding to a total range delay of $D_T'+D_R'$ (front edge) to $D_T''+D_R''$ (back edge), thus occupying a location corresponding to an interval Ip between the front edge and back edge of the combustion reaction. Varying the range delay, e.g., to a value greater than and less than the average $((D_T'+D_R')+(D_T''+D_R''))/2$, may help to identify combustion reaction (or flame) shape and/or size. By correlating a detected shape and/or size to a (known) fuel flow rate, an inference may be made as to combustion reaction stability.

Figure 2:
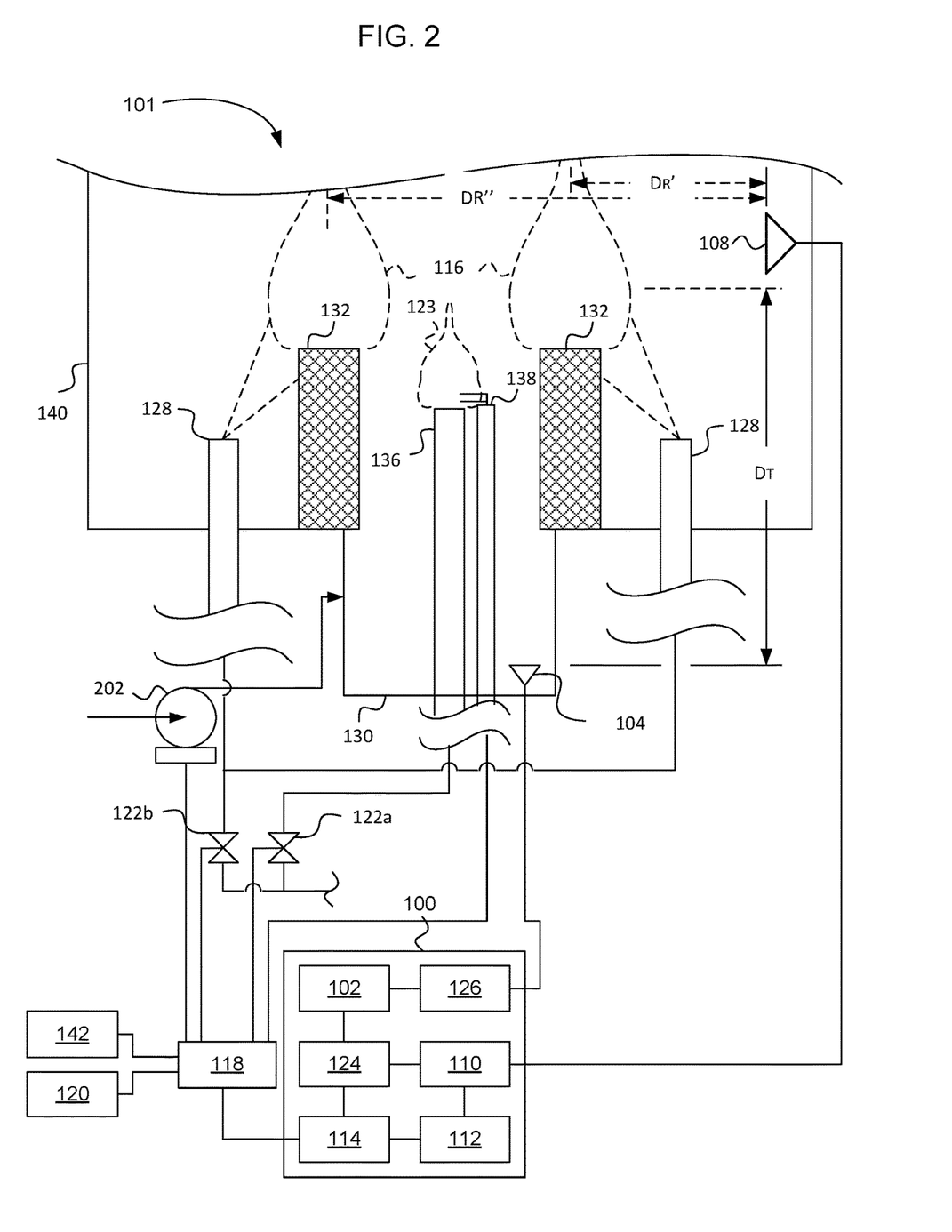
FIG. 2 is a simplified block diagram of a combustion system including a UWB combustion sensor, according to another embodiment.

FIG. 2 is a simplified block diagram of a combustion system 201 including an UWB combustion sensor 200, according to another embodiment.

In an embodiment, referring to FIG. 2, the receiving electrode 108 is a different electrode from the transmission electrode 104. In another embodiment, the transmission electrode 104 and the receiving electrode 108 are disposed to cause at least a portion of the transmitted pulse energy to propagate through the nominal location of the combustion reaction 116. In one embodiment, a combustion air source 130 is configured to receive combustion air from a combustion air blower 202, and the electronic controller 118 is operatively coupled to the combustion air blower 202 and configured to control combustion air delivery by controlling the combustion air blower 202 responsive to the combustion state variable. In another embodiment, the transmission electrode 104 is configured to be disposed at a location proximate to a flame holder 132 distal from a fuel nozzle 128 and combustion air source 130.

According to an embodiment, the signal processor 114 and the electronic controller 118 cooperate to produce a combustion state variable comprising a 32-bit word corresponding to a smoothed scalar value representing a concentration of charged particles associated with the combustion reaction 116. The combustion state variable thus represents a smoothed rate of combustion.

According to another embodiment, the combustion state variable includes a variable value representing both a rate of reaction and a noise component. In embodiments, the noise component may correspond to measures of combustion turbulence (e.g., when the noise component represents a high frequency noise) and/or instability (e.g., when the noise component has a frequency component corresponding to oscillations in flame presence in the measured field).

Figure 3A:
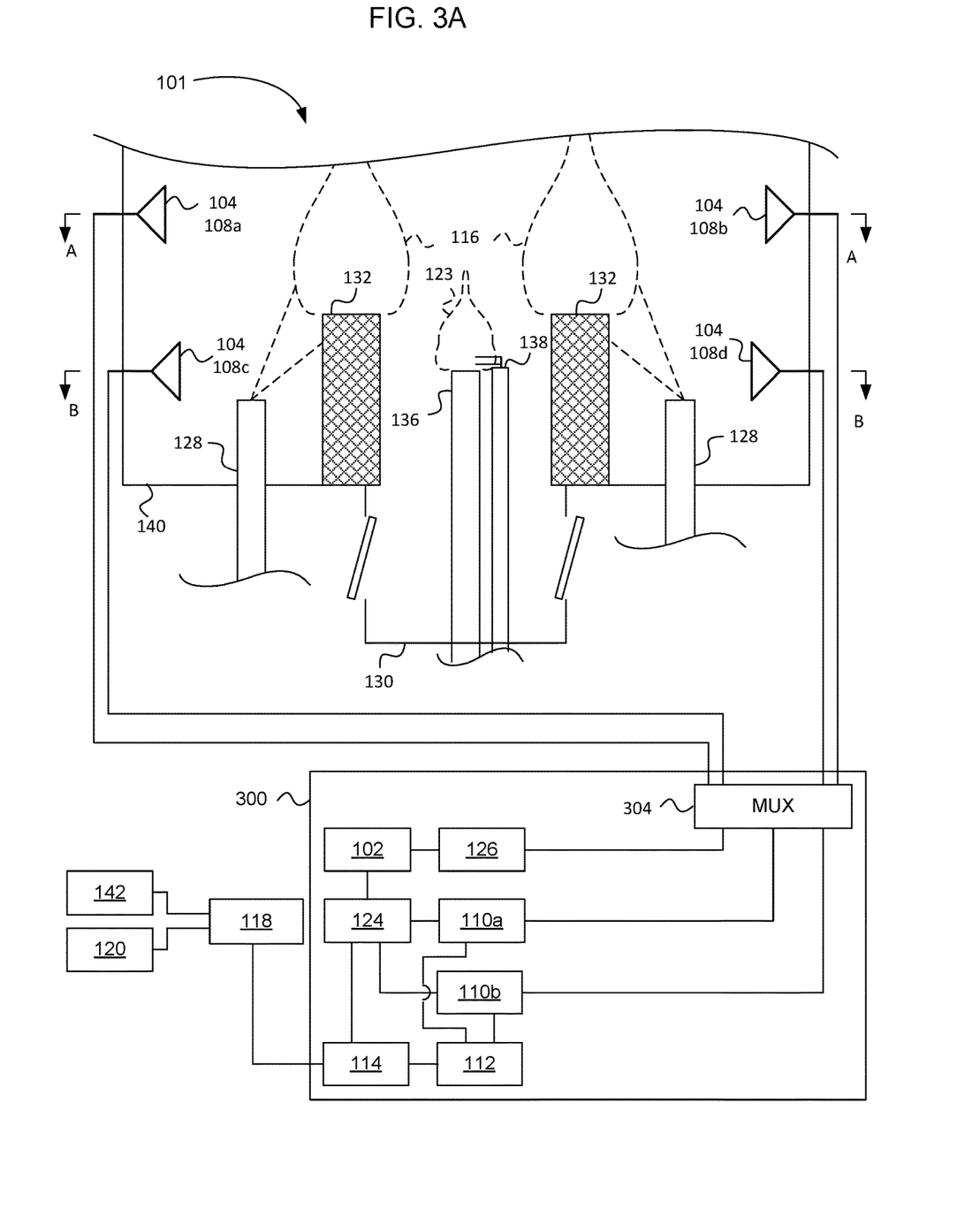
FIG. 3A is a simplified block diagram of a combustion system including a UWB combustion sensor, according to another embodiment.
Figure 3B:
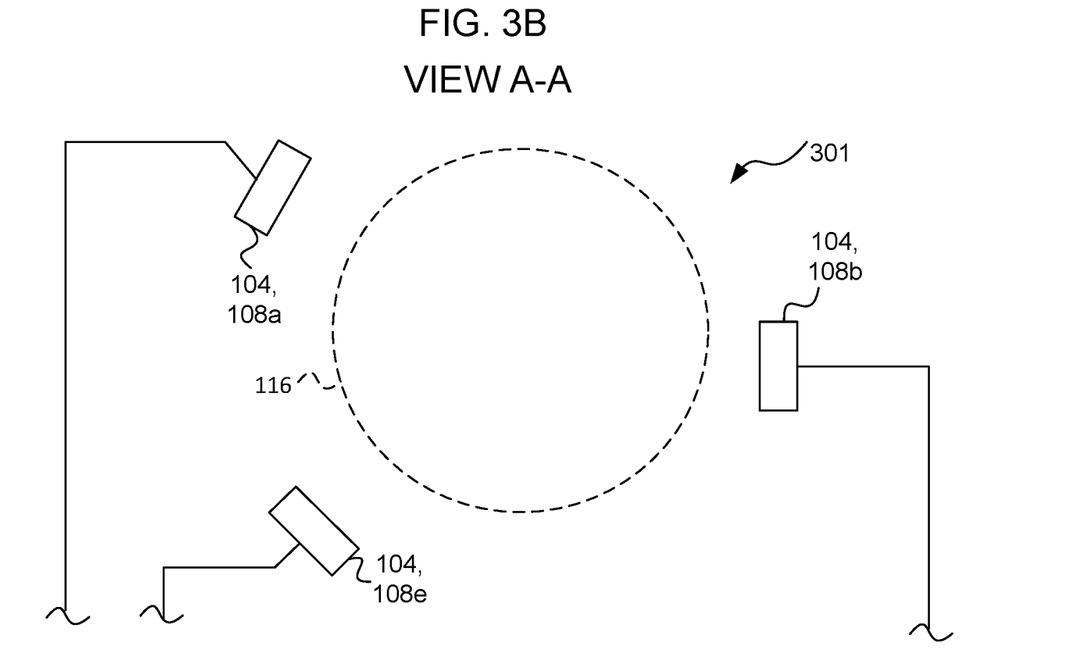
FIG. 3B is a simplified diagram of an arrangement of electrodes in a cross-sectional view at a location indicated in FIG. 3A, according to an embodiment.
Figure 3C:
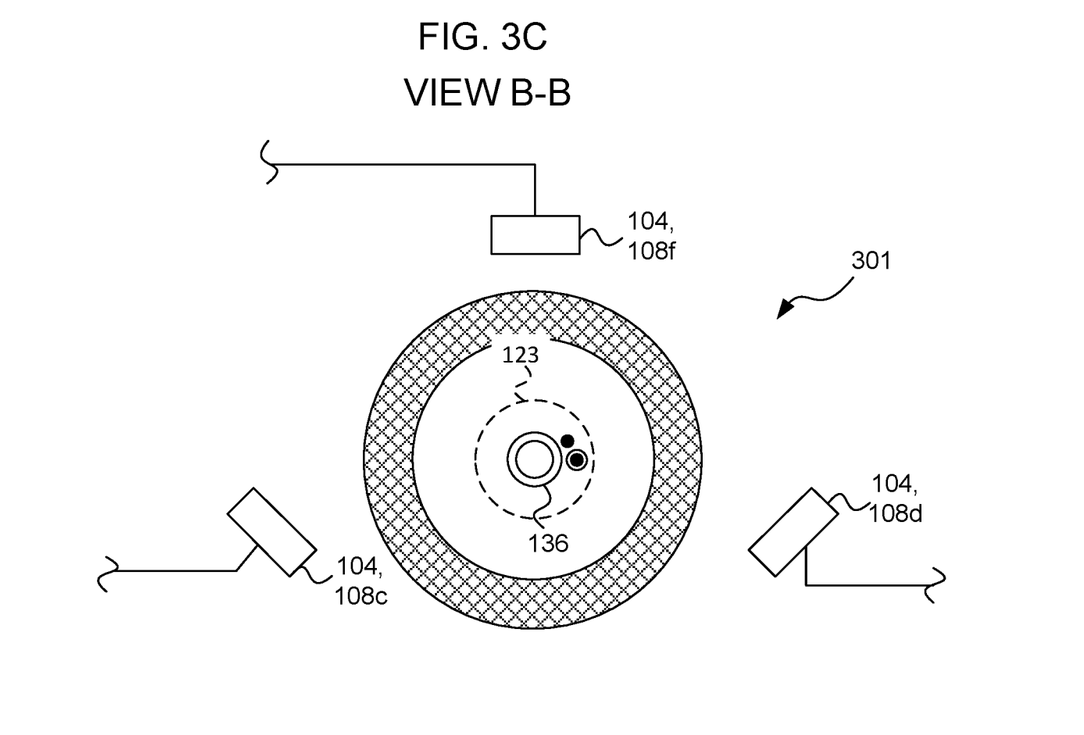
FIG. 3C is a simplified diagram of an arrangement of electrodes in a cross-sectional view at another location indicated in FIG. 3A, according to an embodiment.

In another embodiment, which may be realized using embodiments illustrated in FIGS. 3A-3C, the UWB combustion sensor 300 may output a combustion state variable that comprehends at least a simplified image or diagram of the combustion reaction 116.

FIG. 3A is a simplified block diagram of a combustion system 301 including an imaging UWB combustion sensor 300, according to an embodiment. FIG. 3B is a simplified diagram of an arrangement of electrodes 104, 108a, 108b, 108e from a top view A-A indicated in FIG. 3A, according to an embodiment. FIG. 3C is a simplified diagram of an arrangement of electrodes 104, 108c, 108d, 108f from a top view B-B indicated in FIG. 3A, according to an embodiment.

According to an embodiment, referring to FIGS. 3A-3C, the receiving electrode 108 includes a plurality of receiving electrodes 108a, 108b, 108c, 108d, 108e, 108f. In one embodiment, the signal processor 114 is operatively coupled to the plurality of receiving electrodes 108a, 108b, 108c, 108d, 108e, 108f, and the signal processor 114 is configured to generate an image corresponding to a combustion reaction physical extent 302 in at least two dimensions. In another embodiment, the plurality of receiving electrodes 108a, 108b, 108c, 108d, 108e, 108f are interchangeably configured as a transmission electrode 104. According to an embodiment, the UWB combustion sensor 300 further includes a multiplexer 304 configured to selectably couple the electrodes 104, 108a, 108b, 108c, 108d, 108e, 108f to a transmission channel and to at least one receiving channel. Referring to FIGS. 3A and 3C, at least a portion 104, 108c, 108d, 108f of the plurality of electrodes 104, 108a, 108b, 108c, 108d, 108e, 108f may be disposed to detect a combustion flashback event.

Referring to FIGS. 1, 2, and 3A, the UWB combustion sensor 100, 200, 300 further may include a transmitter circuit 126 operatively coupled to the pulse generator 102 and configured to amplify the voltage pulse. The transmission electrode 104 may be operatively coupled to the transmitter circuit 126.

According to an embodiment, the UWB combustion sensor 100, 200, 300 further may include a transmitter circuit 126 operatively coupled to the pulse generator 102 and configured to control the transmitted pulse length.

According to another embodiment, the UWB combustion sensor 100, 200, 300 further may include a range delay circuit 124 operatively coupled to the pulse generator 102 and the receiver circuit 110 and configured to time operation of the receiver circuit 110 to sample the received pulse after a propagation delay from the transmitted pulse selected to cause detection at range corresponding to a nominal combustion reaction 116 location.

According to an embodiment, the transmission electrode 104 is configured to be disposed at a location corresponding to a fuel nozzle 128 and/or a combustion air source 130. The UWB combustion sensor 100, 200, 300 further may include a range delay circuit 124 configured to cause the receiver circuit 110 to sample and hold the received pulse at a time delayed from pulse transmission, the delay time corresponding to time-of-flight corresponding to a distance $D_T$ from the transmission electrode 104 to a distal flame holder 132 plus a distance $D_R$ from the distal flame holder 132 to the receiving electrode 108, 108a, 108b.

Referring again to FIG. 1, a combustion system 101 includes a fuel nozzle 128 configured to output fuel into a combustion volume 106, a combustion air source 130 configured to provide combustion air into the combustion volume 106, a flame holder 132 aligned to receive mixed fuel and air from the fuel nozzle 128 and combustion air source 130 and configured to hold a combustion reaction 116 supported by the fuel and combustion air, a UWB combustion sensor 100 configured to transmit a transmitted electromagnetic pulse toward the flame holder 132 from a first separation distance $D_T$ and to detect, at a second separation distance $D_R$, a received electromagnetic pulse affected by the combustion reaction 116 and to output a combustion state variable corresponding to the effect, and a burner controller 118 operatively coupled to the ultra wideband combustion sensor 100, the burner controller 118 being configured to control the combustion reaction 116 responsive to the received combustion state variable. The first and second separation distances $D_T$, $D_R$ may be substantially the same separation distance.

According to an embodiment, the combustion system 101 further includes a pilot fuel flow control valve 122a operatively coupled to the pilot burner 136 and a main fuel flow control valve 122b operatively coupled to a main fuel nozzle 128, each being operatively coupled to the burner controller 118. The burner controller 118 may be configured to control the combustion reaction 116 by controlling fuel flow control valves 122a, 122b responsive to the combustion state variable.

According to an embodiment, the combustion system 101 further includes a combustion air control damper 134. The burner controller 118 may be configured to control the combustion reaction 116 by controlling a flow of air through the combustion air control damper 134 responsive to the combustion state variable.

According to an embodiment, referring to FIG. 2, the combustion system 101 further includes a combustion air blower 202. The burner controller 118 may be configured to control the combustion reaction 116 by controlling a flow of air through the combustion air blower 202 responsive to the combustion state variable.

According to an embodiment, referring again to FIG. 1, the combustion system 101 further includes a pilot burner 136 disposed to support a pilot flame 123 to provide heat to the flame holder 132 and to provide ignition to the main fuel. The burner controller 118 may be configured to control the combustion reaction 116 by controlling fuel flow to the pilot burner 136 responsive to the combustion state variable.

According to an embodiment, the combustion system 101 further includes an ignition source 138 disposed to ignite a pilot burner 136 or the fuel and air mixture. The burner controller 118 may be configured to control the ignition source 138 responsive to the combustion state variable.

Referring to FIGS. 1A-3C above, the UWB combustion sensor 100, 200, 300, according to embodiments, may include a pulse generator 102 configured to output a relatively short voltage pulse that is applied to a transmission electrode 104. A typical transmitted pulse width may be between about 200 picoseconds and about 5 nanoseconds, for example. The voltage pulse may be conditioned and amplified (or attenuated) for output by a transmitter circuit 126. For example, the transmitter circuit 126 may transmit the voltage pulse and/or may further condition the voltage pulse, such as by differentiating a leading and/or trailing edge to produce a short sub-nanosecond transmitted pulse. The voltage pulse is typically not modulated onto a carrier frequency. Rather, the voltage pulse transmission spectrum is the frequency domain transform of the emitted pulse. The UWB combustion sensor 100, 200, 300 may probe a combustion volume 106 by emitting a series of spaced voltage pulses. For example, the series of voltage pulses may be spaced between about 100 nanoseconds and 100 microseconds apart. Typically, the pulse generator 102 emits the voltage pulses with non-uniform spacing such as random or pseudo-random spacing, although constant spacing may be used, such as if interference is not a concern. Spacing between the series of voltage pulses may be varied responsive to detection of one or more transient condition(s) in a combustion reaction 116 in the combustion volume 106. For example, the spacing between pulses may be relatively large when a stable combustion reaction 116 is detected in the combustion volume 106. Spacing between pulses may be decreased (e.g., responsive to one or more commands from an electronic controller 118) when a transient condition in the combustion reaction 116 is detected in the combustion volume 106. For example, the decreased time between pulses may result in faster UWB combustion sensor 100, 200, 300 generation of combustion state variable data for purposes of more quickly determining information about the combustion reaction 116. The emitted series of voltage pulses may be characterized by spectral components having high penetration that can pass through a range of materials and geometries in the combustion volume 106.

A combustion reaction 116 in the combustion volume 106 is characterized by charged particles that differentially reflect, refract, absorb, delay, and/or otherwise scatter the transmitted pulses according to presence of the combustion reaction 116. A received signal including a reflected, refracted, absorbed, delayed, and/or otherwise scattered signal may be received by a receiving electrode 108. Optionally, the receiving electrode 108 and the transmission electrode 104 may be combined into a single electrode. In a single electrode embodiment, a filter 124 may be used to separate the received pulse from the transmitted pulse in the circuitry of the UWB combustion sensor 100, 200, 300.

A combustion volume 106 may be defined according to an angular extent and distance from the transmission electrode 104 and the receiving electrode 108. Detection distance may be determined by a range delay circuit 124 configured to trigger a receiver circuit 110 operatively coupled to the receiving electrode 108. For example, the receiver circuit 110 may include a voltage detector such as a capture-and-hold capacitor or capacitor network. The range delay, controlled by the range delay circuit 124, may correspond to a transmission distance from the transmission electrode 104 to a nominal combustion reaction 116 location (such as a distal flame holder 132) plus a transmission distance from the nominal combustion reaction 116 location to the receiving electrode 108. In another embodiment, the range delay may correspond to a transmission distance from the transmission electrode 104 to an RF reflective surface 140 and back to the receiving electrode 108, such that the transmitted pulse passes twice through the combustion reaction 116. Range delay may be modulated to capture information corresponding to different or a range of combustion reaction 116 locations.

A signal processor 114 may be configured to receive detection signals or data from the receiver circuit 110 and an analog-to-digital converter 112. By correlating range delay to the detection signal, data corresponding to a physical extent 302 of the combustion reaction 116 the combustion volume 106 (or more specifically, a physical extent of a volume of charged particles associated with the combustion reaction 116) may be determined or inferred.

According to an embodiment, referring to FIGS. 1B and 2, a UWB combustion sensor 200 may include a receiving electrode 108 separate from the transmission electrode 104.

According to an embodiment, referring to FIG. 3A, a UWB combustion sensor 300 may include a plurality of receiving electrodes 108*a*, 108*b*. The plurality of receiving electrodes 108*a*, 108*b* may be operatively coupled to a second receiver circuit 110*b* operatively coupled to an output of the range delay circuit 124 or to a separate range delay circuit (not shown) configured to provide a delay selected for a depth into the combustion volume 106 corresponding to a nominal location of the combustion reaction 116. Alternatively, the UWB combustion sensor 300 may include a switch or a multiplexer configured to couple plural receiving electrodes 108*a*, 108*b* into a smaller number of receiving circuits 110*a*, 110*b*, such that the plurality of receiving electrodes 108*a*, 108*b* are successively selected to receive successive transmitted pulses. The signal processor 114 may receive output from a second A/D converter (e.g., 112) operatively coupled to a second receiver circuit 110*b*.

The signal processor 114 may be configured to compare detection signals received by the plurality of receiving electrodes 108*a*, 108*b*. For example, the signal processor 114 may search for common signal characteristics such as similar reflected static signal strength or spectrum, similar (or corresponding) Doppler shift, and/or common periodic motion components, and compare the respective range delays corresponding to detection by the respective plurality of receiving electrodes 108*a*, 108*b*. Signals sharing one or more characteristics may be correlated to triangulate to a location or physical extent 302 of the combustion reaction 116 in the combustion volume 106 relative to known locations of the plurality of receiving electrodes 108*a*, 108*b*. The triangulated locations may be output as computed ranges of angle or extent, or as an image of the combustion reaction 116.

For example, a first signal corresponding to a received pulse received by a receiving electrode 108*a* may be digitized by an analog-to-digital converter (A/D) 112 to form a first digitized waveform. A second signal corresponding to the received pulse received by a second receiving electrode 108*b* may similarly be digitized by the A/D converter 112 (or alternatively by a different A/D converter, not shown) to form a second digitized waveform. The signal processor 114 may compare the first and the second digitized waveforms and deduce angular information from the first and the second digitized waveforms and known geometry of the first and the second receiving electrodes 108*a*, 108*b*.

A second pulse may be received at a second range delay value and may be similarly signal processed to produce a second set of angular information that maps to a combustion reaction physical extent 302 at a different distance. Depth within a given range delay may be inferred from a strength of the received pulse. A greater number of received pulses may be combined to provide additional combustion reaction physical extent 302 vs. depth information. A series of pulses may be combined to form a time series of signals corresponding to the combustion reaction 116 that includes movement information of the combustion reaction 116, such as oscillations, flashback, blow-off, mean location drift, vortex formation, etc.

The signal processor 114 outputs UWB combustion state data. The UWB combustion state data may include spatial information, time-domain motion information, and/or frequency domain information. Optionally, the UWB combustion state data may be output in the form of an image. The UWB combustion state data in the form of an image may include a surface slice made of pixels or a volume made of voxels. Optionally, the image may include vector information.

The UWB combustion state data from the signal processor 114 may be output to an electronic controller 118. The electronic controller 118 may be integrated with the signal processor 114 and/or may be included in the same UWB combustion sensor 100, 200, 300. Alternatively, the signal processor 114 may output UWB combustion state data through an interface to the electronic controller 118 of the combustion system 101, 201, 301.

Referring again to FIG. 1, the electronic controller 118 may be configured to extract desired information from UWB combustion state data received from the signal processor 114. Data corresponding to the extracted information may be saved in a memory for access by a data interface 142 or may be pushed out the data interface 142.

The electronic controller 118 may be operatively coupled to the pulse generator 102, the transmitter circuit 126, the range delay circuit 124, the receiver circuit 110, the analog-to-digital converter 112, and/or the signal processor 114 to control the operation of the components of the UWB combustion sensor 100. For embodiments so equipped, the electronic controller 118 may also be operatively coupled to a second receiver circuit 110*b* and/or to a second analog-to-digital converter (not shown). A data interface 142 may include a high speed interface configured to output data from the signal processor 114. Additionally or alternatively, the data interface 142 may provide simplified combustion state data to a supervisory system.

Figure 4:
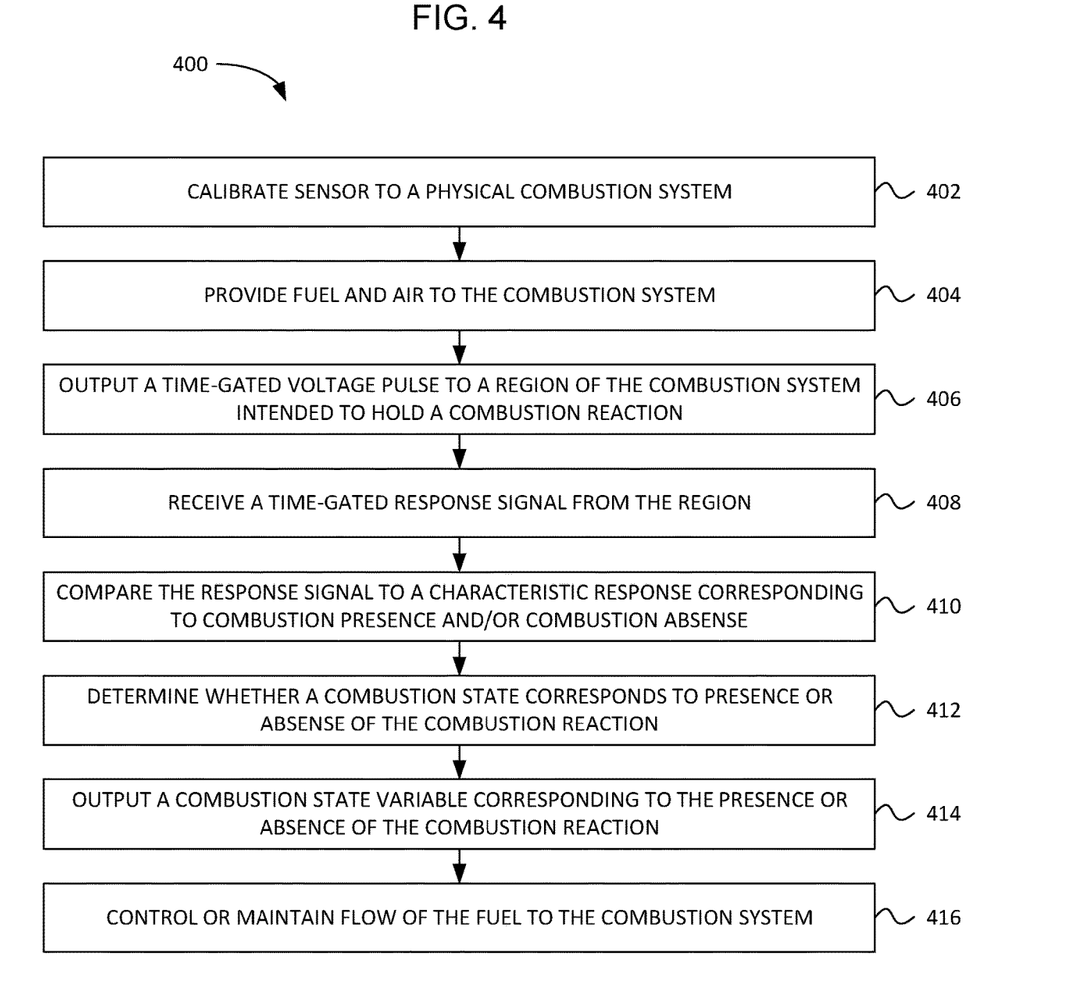
FIG. 4 is a flow chart showing a method for operating a burner system using time-gated sensor systems described herein, according to an embodiment.

FIG. 4 is a flow chart showing a method 400 for operating a burner system using time-gated sensor systems described herein, according to an embodiment. During normal operation, the method 400 may begin at step 404, which includes providing fuel and combustion air to a burner. In many applications, such as in an industrial process burner or a commercial boiler, there is not an operator always present and, if present, the operator may not always be able to see that a combustion reaction of the fuel and combustion air remains lit. Accordingly, it may be useful to use a combustion sensor to verify that combustion is present and/or provide feedback for automatic control of combustion parameters. There are many types of combustion sensors, but the type of sensor described and claimed herein has advantages over prior art combustion sensors. Such a sensor may be used to monitor a main combustion reaction and/or may be used to monitor a continuous pilot combustion reaction.

Proceeding to step 406, the combustion sensor outputs a time-gated voltage pulse at a first moment to a region intended to hold the combustion reaction supported by the fuel and combustion air. Step 408 includes receiving a time-gated response signal from the region intended to hold the combustion reaction at a second moment delayed relative to the first moment.

Combustion reactions are generally characterized by the presence of short-lived charged species that arise during the reaction. Such charged species affect capacitance and/or conductivity of the volume occupied by the combustion reaction. Presence of charged species may be used to verify presence of the combustion reaction. Conversely, absence of charged species may be indicative of a loss of ignition and corresponding venting of a combustible mixture to the interior of the combustion system and/or to the atmosphere. Such a situation may pose a hazard requiring corrective action.

Similarly, although with a somewhat longer time constant, the presence of heat corresponding to the combustion reaction may cause conductivity or capacitance of at least physical portions of a burner system disposed in or adjacent to a nominal combustion to have a first value, while absence of combustion reduces the heat and, via the nominally heated structures, causes the combustion region to have a different characteristic conductivity and/or capacitance. The presence or absence of charged species provides the most rapid assessment of the presence of combustion.

Changes in capacitance and/or conductivity corresponding to the presence or absence of combustion causes perturbation of the time-gated pulse output in step 406, which in turn affects the response signal received in step 408.

Proceeding to step 410, the response signal is compared to at least one of a pattern corresponding to a presence or a pattern corresponding to an absence of the combustion reaction. For example, the combustion sensor provides characterization of the combustion state by comparing the response signal to both states and identifying the state most similar to the response signal.

Step 412 includes determining whether a combustion state corresponds to presence or absence of the combustion reaction. Steps 410 and 412 may, for example, make use of statistical logic such as Bayesian processing. To maximize certainty of the detected combustion state, the process of outputting the time-gated pulse and receiving the response signal may be repeated at intervals (such as random or pseudo-random intervals, in the case of an FCC unlicensed installation) with results compared to one another before a combustion state is definitively determined. In one embodiment, pulses are emitted and received at a rate of several per second and the system uses a running 2-of-3 or 3-of-5 voting algorithm to de-bounce the sensor to deliver a second or sub-second response time.

The method 400 proceeds to step 414, including outputting a combustion state variable corresponding to the presence or absence of the combustion reaction. The act of "outputting" may involve output from a sensor sub-system to a burner electronic controller and/or to an electronic display visible to an operator. In an embodiment, the method 400 proceeds to step 416, including controlling or maintaining a fuel source for the fuel according to the combustion state variable and a desired state. E.g., if the burner is intended to be lit, the system is controlled to maintain the state or to turn off the fuel to avoid a dangerous situation if combustion is lost. Additionally or alternatively, longer-term trends may be used to trim the combustion system for maximum efficiency and/or stability. Additionally or alternatively, the combustion controller may operate an igniter and/or a continuous pilot burner in a manner to maintain combustion.

In an embodiment, receiving the time-gated response signal in step 408 includes amplifying the time-gated response signal.

The second moment, during which the response signal is received may have a duration greater than the first moment. The second moment may be delayed from the first moment according to a voltage pulse and a response signal flight time. In an embodiment, the second moment includes a plurality of second moments gated at respective delays from the outputting of the voltage pulse. This may be used, for example, to determine a location of the combustion reaction.

In an embodiment, the second moment (during which the response signal is received) is sufficiently short in duration to reject a multipath component of the response signal.

In another embodiment, the second moment is sufficiently long in duration to receive a plurality of multipath components of the response signal. During installation and calibration, an engineer or algorithm may determine which response signal gating approach provides a more robust measurement of combustion.

Typically, the time-gated output pulse is output from an antenna or electrode substantially instantaneously. The output pulse has a spectrum corresponding to the shape of the output antenna. Since different spectral components may be affected differently by the presence of combustion, it may be useful to divide the response signal into spectral components and performing processing on selected spectral components.

The method 400 may further include dividing the time-gated response signal into frequency bins, each frequency bin holding a signal proportional to a respective passband characterizing the response signal, and converting the held signals to corresponding bin digital data values. Comparing the response signal to at least one of a pattern corresponding to a presence or a pattern corresponding to an absence of the combustion reaction in step 410 may include comparing the bin digital data values to one or both of a pattern corresponding to the presence of the combustion reaction and a pattern corresponding or the absence of the combustion reaction.

As indicated above, steps 404 through 416 may occur during normal operation of the burner. Typically, a burner is characterized with respect to the response signal produced by known combustion-present and combustion-not-present states. The characterization may be performed during installation of the system and/or periodically (and/or automatically) during cycling of the system between "on" and "off" states.

Accordingly, the method 400 may include step 402, including calibrating the time-gated electromagnetic pulse combustion sensor to the physical combustion system, including calibrating the time-gated response signal to the presence or absence of the combustion reaction.

Calibrating the time-gated response signal to the presence of the combustion reaction may include outputting the voltage pulse during a first known combustion state wherein the combustion reaction is observed to be present and receiving the response signal. Similarly, calibrating the time-gated response signal to the absence of the combustion reaction may include outputting the voltage pulse during a second known combustion state wherein the combustion reaction is observed to be absent and receiving the response signal.

A particular instance of a furnace may characterized by the calibrating of the time-gated response signal to the known combustion state. Additionally or alternatively, at least one of a particular furnace model and a particular burner model may characterized by the calibrating of the time-gated response signal.

Prior to calibrating the time-gated response signal, at least one time-gated sensor antenna may be installed with the burner. Additionally or alternatively, at least one time-gated sensor antenna may be installed in a furnace in which the burner is installed prior to calibrating the time-gated response signal.

The system described herein is contemplated to be applicable to main burners and or to continuous pilot burners.

In an embodiment, providing fuel and combustion air to a burner includes providing fuel and combustion air to a pilot burner. Outputting the time-gated voltage pulse at a first moment to the region intended to hold the combustion reaction may thus include outputting the time-gated voltage pulse to a nominal position of a pilot burner flame. Receiving the time-gated response signal from the region intended to hold the combustion reaction may accordingly include receiving the time-gated response signal from the nominal position of the pilot burner flame.

Generally speaking, the method 400 is repeated at intervals during operation of the burner system.

Outputting the time-gated voltage pulse may include outputting a plurality of time-gated voltage pulses and receiving the time-gated response signal includes receiving a plurality of time-gated response signals. Comparing the response signal to the at least one of the pattern corresponding to a presence or the pattern corresponding to the absence of the combustion reaction may include, for each response signal, comparing a spectrum of the response signal to a corresponding spectrum pattern.

Determining whether the combustion state corresponds to presence or absence of the combustion reaction may include obtaining a plurality of measurements combining the plurality of measurements to logically eliminate or characterize noise in the plurality of measurements, such that the determination meets a predetermined certainty.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A combustion system, comprising:
    a fuel nozzle configured to output fuel into a combustion volume;
    a combustion air source configured to provide combustion air into the combustion volume;
    a flame holder aligned to receive mixed fuel and air from the fuel nozzle and the combustion air source and configured to hold a combustion reaction supported by the fuel and the combustion air;
    an ultra wideband combustion sensor configured to transmit a transmitted electromagnetic pulse toward the flame holder from a first separation distance and to detect, at a second separation distance, a received electromagnetic pulse affected by the combustion reaction and to output a combustion state variable corresponding to the effect; and
    a burner controller operatively coupled to the ultra wideband combustion sensor, the burner controller being configured to control the combustion reaction responsive to the received combustion state variable.

2. The combustion system of claim 1, wherein the first and the second separation distances are substantially the same separation distance.

3. The combustion system of claim 1, further comprising:
    a fuel control valve operatively coupled to the fuel nozzle and operatively coupled to the burner controller;
    wherein the burner controller is configured to control the combustion reaction by controlling fuel flow to the fuel nozzle responsive to the combustion state variable.

4. The combustion system of claim 1, further comprising:
    a combustion air control damper;
    wherein the burner controller is configured to control the combustion reaction by controlling a flow of air through the combustion air control damper responsive to the combustion state variable.

5. The combustion system of claim 1, further comprising:
    a combustion air blower;
    wherein the burner controller is configured to control the combustion reaction by controlling a flow of air through the combustion air blower responsive to the combustion state variable.

6. The combustion system of claim 1, further comprising:
    a pilot burner disposed to provide heat to the flame holder;
    wherein the burner controller is configured to control the combustion reaction by controlling fuel flow to the pilot burner responsive to the combustion state variable.

7. The combustion system of claim 1, further comprising:
    an ignition source disposed to ignite a pilot burner or the fuel and air mixture;
    wherein the burner controller is configured to control the ignition source responsive to the combustion state variable.

8. A method for operating a combustion system, comprising:
    providing fuel and combustion air to a burner;
    outputting a time-gated voltage pulse at a first moment to a region intended to hold a combustion reaction supported by the fuel and combustion air;
    receiving a time-gated response signal from the region intended to hold the combustion reaction at a second moment delayed relative to the first moment;
    comparing the response signal to at least one of a pattern corresponding to a presence or a pattern corresponding to an absence of the combustion reaction;
    determining whether a combustion state corresponds to presence or absence of the combustion reaction;
    outputting a combustion state variable corresponding to the presence or absence of the combustion reaction; and
    controlling or maintaining a fuel source for the fuel according to the combustion state variable and a desired state.

9. The method for operating a combustion system of claim 8, wherein receiving the time-gated response signal includes amplifying the time-gated response signal.

10. The method for operating a combustion system of claim 8, wherein the second moment has a duration greater than the first moment.

11. The method for operating a combustion system of claim 8, wherein the second moment is delayed from the first moment according to a voltage pulse and a response signal flight time.

12. The method for operating a combustion system of claim 8, wherein the second moment includes a plurality of second moments gated at respective delays from the outputting of the voltage pulse.

13. The method for operating a combustion system of claim 8, wherein the second moment is sufficiently short in duration to reject a multipath component of the response signal.

14. The method for operating a combustion system of claim 8, further comprising:
    dividing the time-gated response signal into frequency bins, each frequency bin holding a signal proportional to a respective passband characterizing the response signal; and
    converting the held signals to corresponding bin digital data values;
    wherein comparing the response signal to at least one of a pattern corresponding to a presence or a pattern corresponding to an absence of the combustion reaction includes comparing the bin digital data values to at least one of a pattern corresponding to the presence of the combustion reaction or a pattern corresponding or the absence of the combustion reaction.

15. The method for operating a combustion system of claim 8, further comprising:
    calibrating a time-gated response signal to the presence or absence of the combustion reaction.

16. The method for operating a combustion system of claim 15, wherein calibrating the time-gated response signal to the presence of the combustion reaction includes outputting the voltage pulse during a first known combustion state wherein the combustion reaction is observed to be present and receiving the response signal.

17. The method for operating a combustion system of claim 15, wherein calibrating the time-gated response signal to the absence of the combustion reaction includes outputting the voltage pulse during a second known combustion state wherein the combustion reaction is observed to be absent and receiving the response signal.

18. The method for operating a combustion system of claim 15, wherein a particular instance of a furnace is characterized by the calibrating of the time-gated response signal to the known combustion state.

19. The method for operating a combustion system of claim 15, wherein at least one of a particular furnace model and a particular burner model is characterized by the calibrating of the time-gated response signal.

20. The method for operating a combustion system of claim 15, further comprising, prior to calibrating the time-gated response signal, installing at least one time-gated sensor antenna with the burner.

21. The method for operating a combustion system of claim 15, further comprising, prior to calibrating the time-gated response signal, installing at least one time-gated sensor antenna in a furnace in which the burner is installed.

22. The method for operating a combustion system of claim 8, wherein providing fuel and combustion air to a burner includes providing fuel and combustion air to a pilot burner;
wherein outputting the time-gated voltage pulse at a first moment to the region intended to hold the combustion reaction includes outputting the time-gated voltage pulse to a nominal position of a pilot burner flame; and
wherein receiving the time-gated response signal from the region intended to hold the combustion reaction includes receiving the time-gated response signal from the nominal position of the pilot burner flame.

23. The method for operating a combustion system of claim 8, wherein outputting the time-gated voltage pulse includes outputting a plurality of time-gated voltage pulses;
wherein receiving the time-gated response signal includes receiving a plurality of time-gated response signals.

24. The method for operating a combustion system of claim 23, wherein comparing the response signal to the at least one of the pattern corresponding to a presence or the pattern corresponding to the absence of the combustion reaction includes:
for each response signal, comparing a spectrum of the response signal to a corresponding spectrum pattern.

25. The method for operating a combustion system of claim 23, wherein determining whether the combustion state corresponds to presence or absence of the combustion reaction includes:
obtaining a plurality of measurements; and
combining the plurality of measurements to logically eliminate or characterize noise in the plurality of measurements, such that the determination meets a predetermined certainty.

\* \* \* \* \*